(12) United States Patent
Mardollo

(10) Patent No.: US 8,245,821 B2
(45) Date of Patent: Aug. 21, 2012

(54) VIBRATION DAMPING DEVICE, PARTICULARLY FOR HYDRAULIC SHOCK ABSORBERS FOR VEHICLES

(75) Inventor: Gianni Mardollo, Mestrino (IT)

(73) Assignee: C.D.A.—Bitubo—di Mardollo Scipione & C. s.n.c., Teolo (IT)

( * ) Notice: Subject to any disclaimer, the term of this patent is extended or adjusted under 35 U.S.C. 154(b) by 224 days.

(21) Appl. No.: 12/662,386

(22) Filed: Apr. 14, 2010

(65) Prior Publication Data

US 2010/0263972 A1    Oct. 21, 2010

(30) Foreign Application Priority Data

Apr. 16, 2009  (IT) .............................. PD2009A0093

(51) Int. Cl.
 *F16F 9/50* (2006.01)
(52) U.S. Cl. ................... 188/283; 188/285; 188/322.19; 267/64.25; 280/276
(58) Field of Classification Search .................. 188/283, 188/266.6, 285, 297, 303, 304, 322.15, 322.19, 188/322.22; 267/64.25, 64.26, 64.28, 217; 280/276, 279, 281.1

See application file for complete search history.

(56) References Cited

U.S. PATENT DOCUMENTS

| 4,807,860 | A | * | 2/1989 | Simons ......................... 267/217 |
| 5,725,226 | A | | 3/1998 | Cabrerizo-Pariente |
| 6,095,541 | A | * | 8/2000 | Turner et al. .................. 280/276 |
| 6,244,609 | B1 | * | 6/2001 | Wilson .......................... 280/276 |
| 6,311,962 | B1 | * | 11/2001 | Marking .................... 267/64.25 |
| 7,296,812 | B2 | * | 11/2007 | Fujita et al. .................... 280/276 |
| 2008/0116622 | A1 | * | 5/2008 | Fox ............................. 267/64.28 |
| 2009/0084644 | A1 | * | 4/2009 | Murakami ................. 188/266.6 |

\* cited by examiner

*Primary Examiner* — Pamela Rodriguez

(74) *Attorney, Agent, or Firm* — Modiano & Associati; Albert Josif; Daniel O'Byrne

(57) ABSTRACT

A vibration damping device for hydraulic shock absorbers for vehicles, having two cartridges, each associated with a shock-absorber integrated in a component of a vehicle, and each comprising a tubular body, with a piston that forms two chambers with variable volumes of incompressible fluid, a first compression chamber, and a second extension chamber. Each piston is carried by a stem exiting from an end of the tubular body and associated with part of the shock-absorber. The piston is provided with bleeding orifices for fluid bleeding. Flow control and throttling for the orifices are provided.

4 Claims, 4 Drawing Sheets

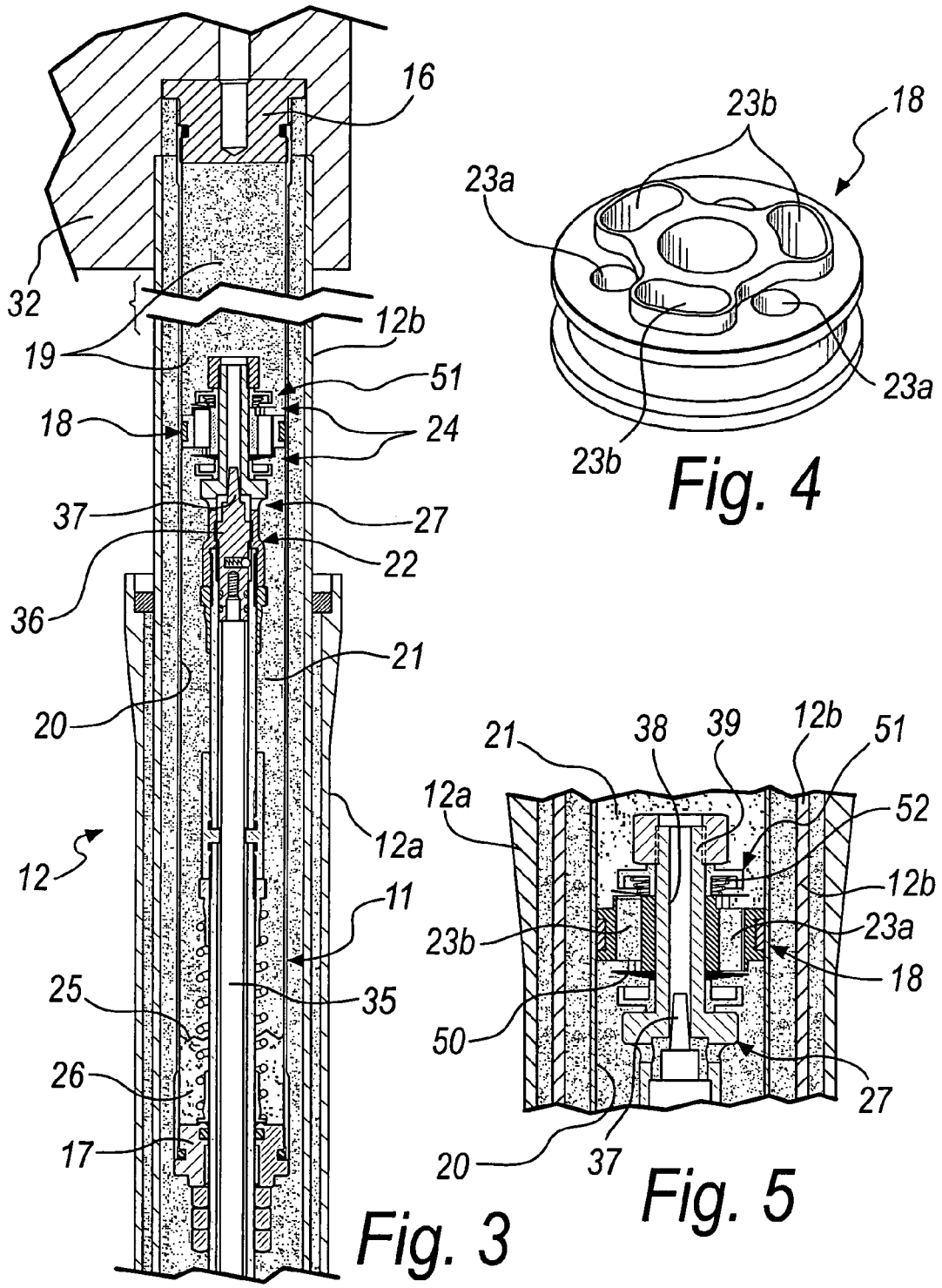

VIBRATION DAMPING DEVICE, PARTICULARLY FOR HYDRAULIC SHOCK ABSORBERS FOR VEHICLES

The present invention relates to a vibration damping device, particularly for hydraulic shock absorbers for vehicles.

BACKGROUND OF THE INVENTION

Shock absorbers of the hydraulic type provided with devices capable of damping the vibrations of the road surface, which otherwise would be discharged onto the arms and back of the driver, making driving tiring and wearying, are currently known and adopted successfully in many types of motorcycles, for example for track racing.

The operation of these hydraulic shock absorbers is based on the principle of the bleeding of a viscous fluid such as oil between the two chambers formed inside a tubular body that is closed at its end by a piston moved by a stem that exits from the tubular body and is to be associated with a frame or a wheel.

One of these two chambers is termed high-pressure chamber and the other one is termed low-pressure chamber.

The motion of the piston causes the bleeding of fluid through the calibrated orifices of the piston from the high-pressure chamber toward the low-pressure chamber.

In known types of hydraulic shock absorbers, a compensation chamber is generally associated with the high-pressure chamber, which is designed to make space for the oil displaced by the entry of the stem in the tubular body, and is often formed in a cup which is external to the main body of the shock absorber, sometimes with the interposition of valve means for adjusting the oil flows, such as a two-way valve or the like.

This external cup is constituted typically by a tubular body which is closed hermetically by end covers and in which a partition is accommodated which can slide or is elastically deformable and forms two chambers, in one of which the incompressible fluid that arrives from the pressurized chamber of the shock absorber is bled and in the second one of such chambers of the cup there is compressible fluid, which defines the means for the elastic return in extension of the shock absorber.

Such external cup is designed to absorb the volume variations inside the tubular body caused by the entry of the piston stem as well as the volume variations of the incompressible fluid due to its heating, and to make the transition from the compression step to the extension step of the shock absorber less abrupt and at the same time not excessively delayed.

Shock absorbers having a structure substantially like the one described above are currently used effectively, yet are not free from drawbacks.

A first one of these drawbacks is the production of high pressure in the elastic return means with compressible fluid in the external cup, which, as mentioned, are needed in order to absorb the volume of oil that cannot remain in the high-pressure chamber, but do not contrast effectively the high pressure transmitted by the associated high-pressure chamber; accordingly, the force that one wishes to generate with the motion of the piston is proportional not only to the resistance that the orifices for the passage of the incompressible fluid offer to the flow of the fluid from the high-pressure chamber to the low-pressure chamber, but also to the elastic response of the elastic return means with compressible fluid that are present in the cup.

This causes a certain delay in the response of the piston in the transition from a compression step to an extension step of the shock absorber or vice versa, a delay which is obviously reflected in the lack of correct trim of the motorcycle when the next stress occurs, and therefore affects the rider.

A second drawback consists in that an external cup, with or without an interposed valve, entails the production and installation of a certain number of components, with an increase both in terms of weight of the fork of the motorcycle and in terms of production, assembly and maintenance costs.

In particular, as regards the weight of the fork, such fork is a non-suspended mass, the inertia of which affects the cycling balance of the motorcycle; moreover, the reciprocating motion of the wheel, rigidly connected to the lower end of the fork, is greatly affected, especially at high frequencies, by the inertia of the external elements that are connected to the sleeve of the fork.

These drawbacks described so far for a motorcycle can occur in the same manner with the shock-absorbing means of a car or of another vehicle in general, as well as with the shock-absorbing means of equipment, machine tools and machinery in general that generate vibrations and stresses which are continuous but have a variable frequency and intensity.

SUMMARY OF THE INVENTION

The aim of the present invention is to provide a vibration damping device, particularly for hydraulic shock absorbers for vehicles, that is capable of obviating the cited drawbacks related to known types of hydraulic shock absorbers.

Within this aim, an object of the invention is to provide a vibration damping device that can be installed easily even on known types of shock absorbers without the need to prepare external cups or the like.

Another object of the invention is to provide a vibration damping device that makes a motorcycle fork more balanced in terms of inertia and therefore guarantees a more comfortable ride to a rider.

A further object of the invention is to provide a vibration damping device that makes it possible to obtain a hydraulic response of the shock absorber that is less delayed than known shock absorbers.

Another object of the invention is to provide a vibration damping device that is cheaper as such and less onerous in terms of maintenance.

Another object of the invention is to propose a vibration damping device, particularly for hydraulic shock absorbers for motorcycles, which is structurally simple, easy to assemble, and can be produced with known systems and equipment at low cost.

This aim, as well as these and other objects that will become better apparent hereinafter, are achieved by a vibration damping device, particularly for hydraulic shock absorbers for vehicles, characterized in that it comprises two cartridges, each of which is to be associated with shock-absorbing means integrated in a component of a vehicle, of a machine or the like, both of said cartridges comprising a tubular body closed hermetically at its ends, which contains a piston that forms two chambers with a variable volume of incompressible fluid, a first compression chamber, and a second extension chamber, each piston being carried by a stem that exits from one end of said tubular body and is associated with part of the shock-absorbing means, said piston being provided with orifices for bleeding the pressurized oil, and corresponding flow control and flow throttling means for said orifices, a first cartridge having, in the extension chamber, which is at low pressure during the compression movement of first shock-absorbing means, a partition, which is movable or elastically deformable and is designed to form a chamber with compressible fluid for volume compensation and propulsion of the incompressible fluid when the movement of the piston is reversed, the second cartridge having, in the compression chamber, at low pressure during the extension movement of second shock-absorbing means, a corresponding partition, which is movable or elastically deformable and is designed to form a chamber with compressible fluid for volume compensation and propulsion of the incompressible fluid when the movement of the piston is reversed.

BRIEF DESCRIPTION OF THE DRAWINGS

Further characteristics and advantages of the invention will become better apparent from the following detailed description of a preferred but not exclusive embodiment of the vibration damping device, particularly for shock absorbers for vehicles, according to the invention, illustrated by way of non-limiting example in the accompanying drawings, wherein:

FIG. 3 is a sectional view of a first cartridge of the device according to the invention, which clearly illustrates its internal structure;

FIG. 4 is a perspective view of a component of the piston of a cartridge of the device according to the invention;

FIG. 5 is a sectional view that explains the operation of a first cartridge of the device upon flow of the incompressible fluid from the high-pressure chamber to the low-pressure chamber in a first step of compression of the shock absorber;

DESCRIPTION OF THE PREFERRED EMBODIMENTS

Figure 1:
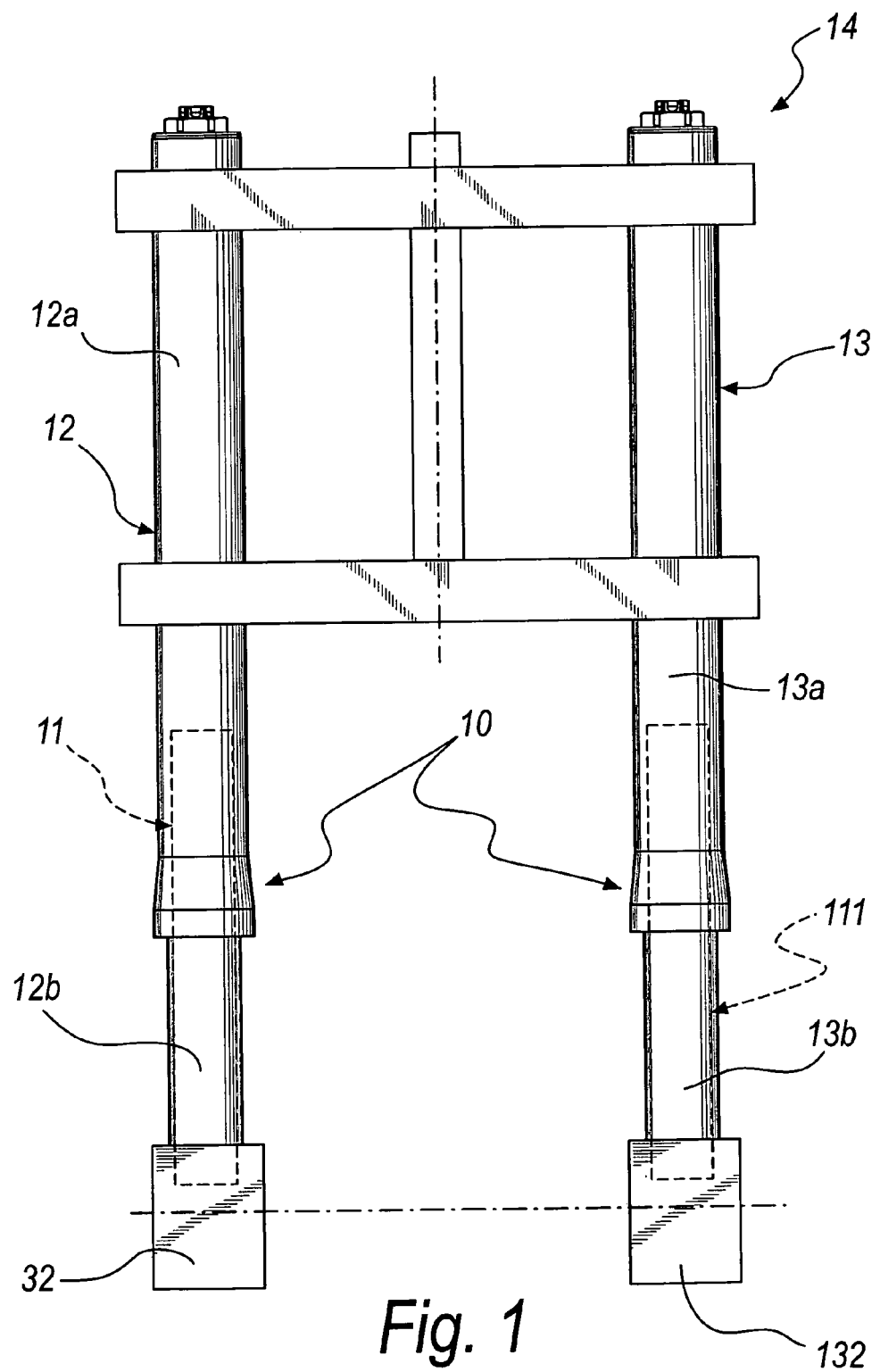
FIG. 1 is a view of a fork of a motorcycle provided with a vibration damping device according to the invention.

With reference to the figures, a vibration damping device according to the invention, particularly for hydraulic shock absorbers for vehicles, is generally designated by the reference numeral 10, as can be seen in FIG. 1.

The device 10 comprises two cartridges, designated respectively by the reference numerals 11 for a first cartridge and 111 for a second cartridge.

Each one of the cartridges 11 and 111 is designed to be connected with, and particularly to be fitted inside, shock-absorbing means, such as, for example but not exclusively, the shock absorbers of a motorcycle. In the exemplary embodiment of the invention, the reference numeral 12 hereinafter designates a first shock-absorbing means, which is constituted by a first shock absorber that has fitted the first cartridge 11, and the reference numeral 13 designates a second shock-absorbing means, which is constituted by a second shock absorber that has fitted the second cartridge 111.

The shock-absorbing means can be said to be generically integrated in a structural component of a vehicle, of a machine or the like.

In the present embodiment of the invention, this component is constituted by a fork 14 of a motorcycle or the like.

Both cartridges 11 and 111 comprise a tubular body 15 and 115 respectively, which is closed hermetically at the ends 16 and 17, 116 and 117.

Each tubular body 15 and 115 contains a piston 18 and 118 that forms two chambers with a variable volume of incompressible fluid 21 and 121.

The first cartridge 11 has a first chamber 19, which is termed compression chamber, and a second chamber 20, which is termed extension chamber.

Likewise, the second cartridge 111 has a first compression chamber 119 and a second extension chamber 120.

The piston 18 and 118 is supported by a stem 22 and 122, which exits from one end, for example the second end 17 and 117, of the tubular body 15 and 115.

The stem 22 and 122 is associated with a component of the corresponding hydraulic shock absorber 12 and 13.

In the embodiment described herein of the device 10 according to the invention, the hydraulic shock absorbers 12 and 13 are of the type with telescopic elements.

The shock absorbers 12 and 13 are composed of a sleeve 12a and 13a and a tubular stem 12b and 13b that performs a translational motion in the respective sleeve.

The tubular body 15 and 115 is fixed to the lower end 32 and 132 of the fork, which is associated with the wheel of the motorcycle, and the tubular stem 12b and 13b of the shock absorber 12 and 13 is also fixed to the lower end 32 and 132 of the fork.

Figure 2:
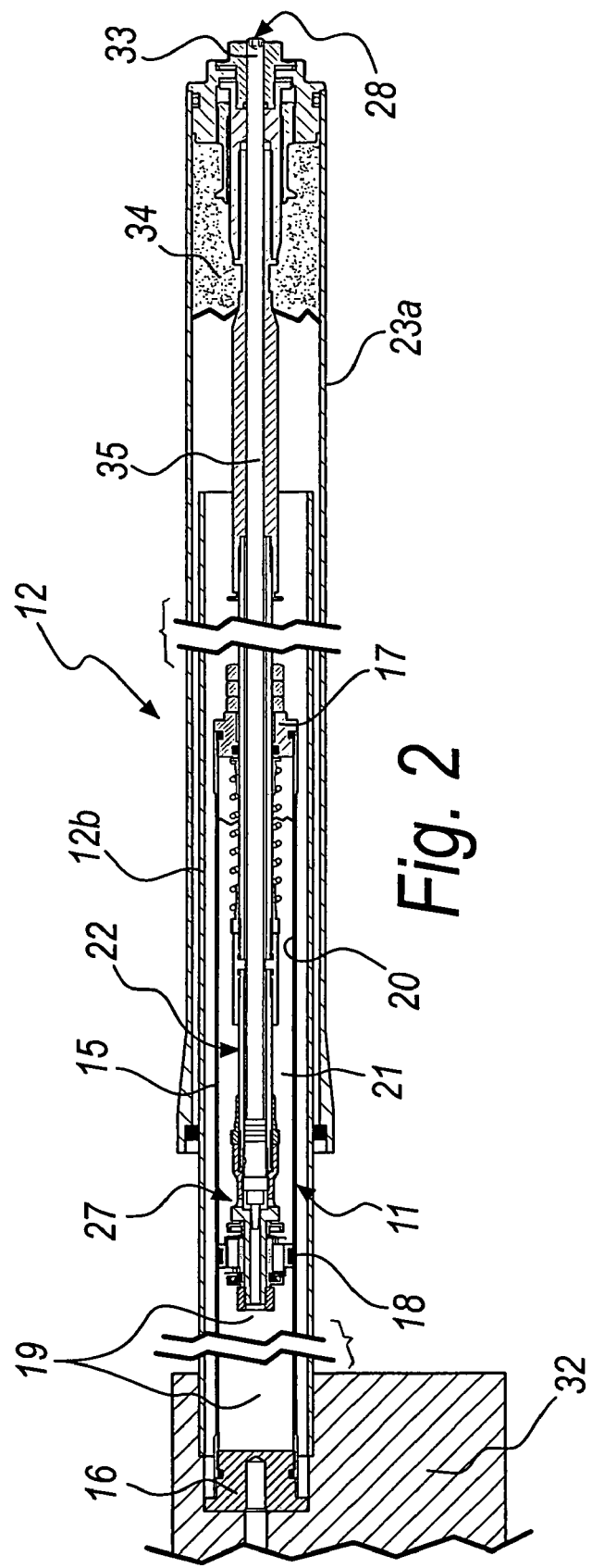
FIG. 2 is a longitudinally sectional side view of one of the two shock absorbers of a fork.

The head 33, visible in FIG. 2, of the stem 22, but also equally 122, of the piston 18 as well as 118, is instead fixed to the end of the sleeve 12a, which in turn is associated with the frame of the motorcycle.

In the exemplified shock absorbers 12 and 13 there is incompressible fluid, typically oil, in the interspace between the cartridges 11 and 111 and the corresponding tubular stem 12b and 13b; said incompressible fluid is also present between the tubular stem 12b and 13b and the respective sleeve 12a and 13a.

There is a chamber with compressible fluid 34 at the end portion of the sleeve 12a; the layout of the shock absorber 12 of FIG. 2 also applies to the other shock absorber 13, except for the particularities of the cartridges contained in the two shock absorbers.

The shock absorber 12 and 13 described here is not to be understood as limiting, but only as exemplifying the possibilities of application of the vibration damping device 10 according to the invention.

The piston 18 and 118 is provided with orifices 23a and 23b and 123a and 123b for the bleeding of the pressurized oil and with corresponding means 24 and 124 for flow control and throttling, which are described in greater detail hereinafter, for said orifices, the operation of which is also described hereinafter.

The stem 22 and 122 has, at the piston 18 and 118, an axial nozzle with variable flow-rate, with adjustment means 28 (illustrated by way of example for both shock absorbers 12 and 13 in FIG. 2) which are available to a user on the outside of the shock absorbers 12 and 13 with which the cartridges 11 and 111 are associated.

In the described embodiment, the adjustment means are constituted by a rod 35 and 135 having a hexagonal socket head and adjustable by means of an Allen key.

Figures 6, 7:
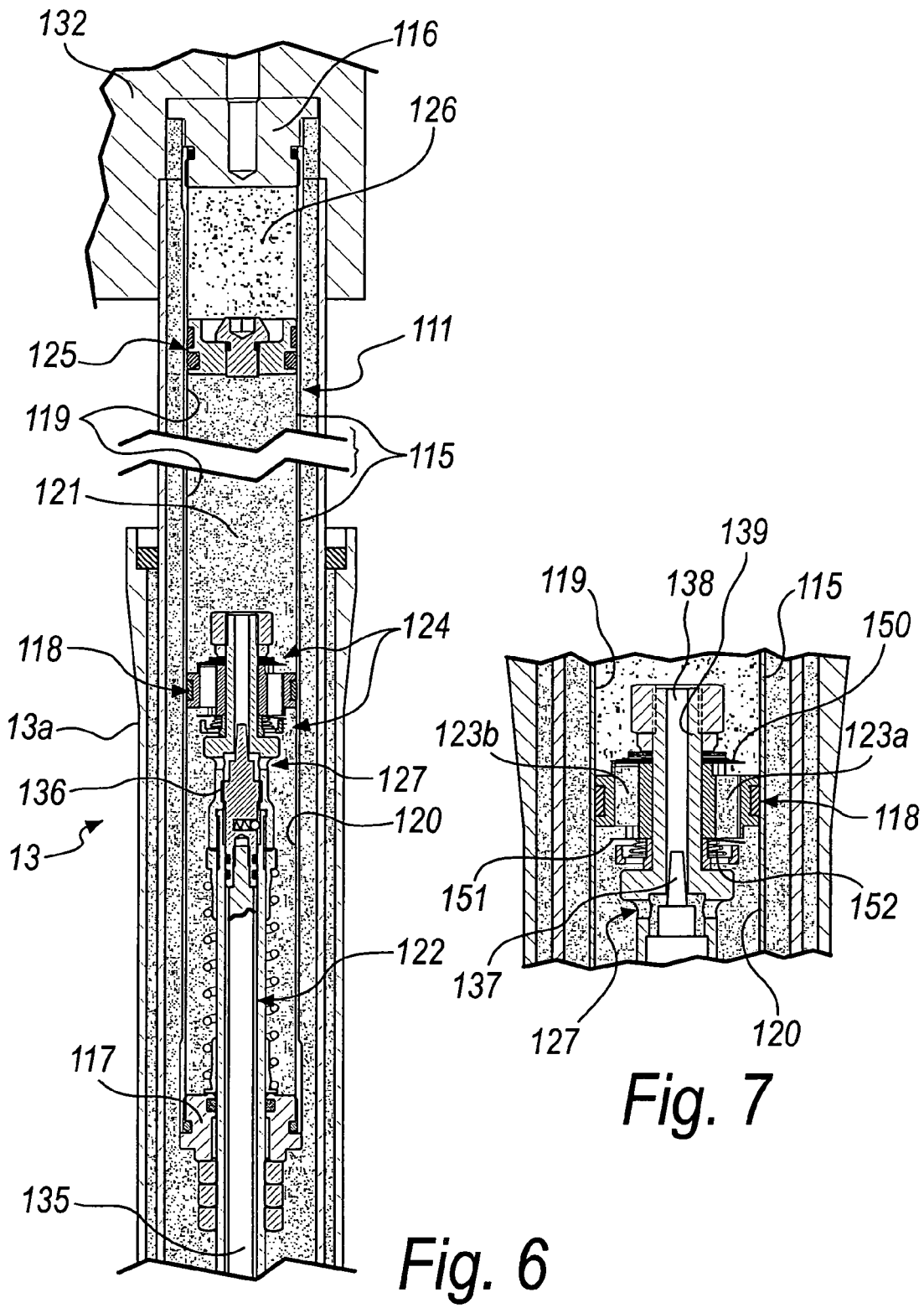
FIG. 6 is a sectional side view of the second cartridge of the device according to the invention.
FIG. 7 is a sectional view that explains the operation of the second cartridge of the device upon flow of the incompressible fluid from the compression chamber to the extension chamber in a second step of compression of the shock absorber.

The rotation of the rod 35 causes, by way of the screw-and-nut mating 36 and 136, the axial movement of the frustum-shaped flow control element 37 and 137 of the nozzle 27 and 127; the axial movement of the frustum-shaped flow control element 37 and 137 determines the greater or smaller opening of the axial channel 38 and 138 formed by a tubular collar 39 and 139 that crosses axially and supports the piston 18 and 118, as clearly shown in FIGS. 5 and 7, which correspond respectively to the first cartridge 11 and to the second cartridge 111.

The first cartridge 11, as shown in FIG. 3, has, in its second extension chamber 20, which is at low pressure during the compression movement of the shock absorber 12, a partition 25 which is elastically deformable and is designed to form a sub-chamber 26 with compressible fluid for volume compensation and propulsion of the incompressible fluid when the movement of the piston is reversed.

The second cartridge 111, as shown in FIG. 6, has, in its compression chamber 119, which is at low pressure during the extension movement of the shock absorber, a corresponding movable partition 125 designed to form a sub-chamber 126 with compressible fluid for volume compensation and propulsion of the incompressible fluid upon reversal of the movement of the piston.

The flow control and throttling means 24 and 124 of the pistons 18 and 118 are adapted to cause
   the first compression chamber 19 of the first cartridge 11 to be the only high-pressure chamber during compression of the shock absorbers 12, 13,
   whereas the second extension chamber 120 of the second cartridge 111 is the only high-pressure chamber during extension of the shock absorbers 12, 13.

During the compression of the shock absorbers 12 and 13, the piston 18 of the first cartridge 11 moves toward the first end 16 of the tubular body 15 and the incompressible fluid passes from the first chamber 19 to the second chamber 20 by way of first orifices 23a of the piston 18 and by way of the axial channel 38.

The flow control and throttling means 24 are constituted, in this constructive example, by elastic disks 50, which are arranged so as to block the first orifices 23a on the side of the second extension chamber 20. The elastic disks 50 are deformed, leaving a passage port, proportionally to the force with which the incompressible fluid presses against them in passing through the corresponding orifices 23a.

Simultaneously, on the opposite side of the piston 18, additional flow control and throttling means are constituted by a membrane device 51, which is pushed by an elastic element 52.

The membrane device 51 blocks the second orifices 23b, preventing the oil from passing through them in said compression step.

The port of the nozzle 27 is preset by maneuvering of the rod 35 as described above.

During the compression movement, the stem 22, which supports the piston 18, enters the tubular body 15, occupying a volume which is proportional to the stroke performed.

Since the fluid oil is incompressible, said volume must be released from the sub-chamber 26 with compressible fluid, and said compressible fluid can be gas or air at a pressure other than atmospheric pressure.

The second cartridge 111, associated with the second shock absorber 13, has the further partition 125, which is rigid and able to perform a translational motion, at the portion of the tubular body 115 that is proximate to the first end 116 fixed to the lower end of the fork 132.

The movable partition 125 forms a sub-chamber 126 with compressible fluid, adjacent to the first chamber 119, which is for compression but never for high pressure, as explained better hereinafter.

During the extension step, the piston 118 moves toward the second end 117 of the tubular body 115 and the incompressible fluid passes from the second chamber 120 to the first chamber 119 by way of second orifices 123b of the piston 118 (FIG. 7) and by way of the axial channel 138.

In this second cartridge 111, the elastic disks 150 are on the side of the first compression chamber 119, while the membrane device 151 with the elastic element 152 is on the opposite side of the piston 118.

The membrane device 151 blocks the first orifices 123a, preventing the oil from passing through them in this extension step.

The elastic disks 50 and 150 and the membrane devices 51 and 151 with the corresponding elastic pusher elements 52 and 152 are provided in such a way that during compression of the two shock absorbers 12 and 13, bleeding of the incompressible fluid 17 of the compression chamber 19 of the first cartridge 11 into the extension chamber 20 takes place more slowly than what occurs in the second cartridge 111, and conversely they are implemented so that during extension of the two shock absorbers 12 and 13 the incompressible fluid 117 of the extension chamber 120 of the second cartridge 111 bleeds more slowly into the compression chamber 119 than into the first cartridge 11.

In this manner, the compression chamber 19 of the first cartridge 11 is the chamber at the highest pressure during the compression step, and the first chamber 19, by not being associated directly with a chamber of compressible fluid, allows immediate application of intense forces, since it is not directly associated with a chamber of compressible fluid and any corresponding valve.

Likewise, for the extension step of the shock absorbers 12 and 13, the extension chamber 120 of the second cartridge 111 is the chamber at the highest pressure during the extension step, and said chamber, by not being directly associated with a chamber of compressible fluid, allows immediate application of intense forces, since it is not directly associated with a chamber of compressible fluid and any corresponding valve.

The two partitions, the elastic partition 25 and the movable partition 125, of the chambers with compressible fluid are involved in the step of compression of the shock absorbers, with the entry of the stems 22 and 122 in the respective tubular bodies 15 and 115, such chambers with compressible fluid being associated with the respective low-pressure chambers of the two cartridges 11 and 111.

The device 10 according to the invention is to be understood as being installable also in an embodiment in which the two cartridges are inside a same shock absorber, for example for a cycle with a wheel that is not supported by a fork or for the wheels of a four-wheel vehicle.

Moreover, the device 10 according to the invention is to be understood as being installable on machines, equipment and systems that are provided with shock-absorbing means which have similar and equivalent problems.

In practice it has been found that the invention achieves the intended aim and objects.

More particularly, the invention provides a vibration damping device that can be installed easily even on shock absorbers of the known type without the need to provide external cups or the like, thanks to the sub-chambers 26 and 126 with compressible fluid provided inside the cartridges 11 and 111 that form the device 10 according to the invention.

Further, by means of the invention a vibration damping device has been devised which renders, for example, a motorcycle fork which is more balanced in terms of inertia and therefore able to guarantee more comfortable riding to a rider, since there is no longer a need to install external cups.

It goes without saying that the provision of the compensation chambers in external cups connected to the chamber at the lowest pressure is to be considered possible in any case, and as a technical solution is to be considered as being within the scope of the appended claims.

Moreover, the invention provides a vibration damping device that makes it possible to obtain a hydraulic response of the shock absorber that is less delayed than in known shock absorbers, thanks to the provision of a high-pressure chamber for the compression step and of a high-pressure chamber for the extension step.

Moreover, by means of the invention a vibration damping device has been devised which is cheaper, since it is composed of fewer components than known devices and is less onerous in terms of maintenance and assembly.

Moreover, by means of the invention a vibration damping device particularly for hydraulic shock absorbers for vehicles has been devised which is simple in structure, easy to assemble and can be manufactured with known equipment and systems at low cost.

The invention thus conceived is susceptible of numerous modifications and variations, all of which are within the scope of the appended claims; all the details may further be replaced with other technically equivalent elements.

In practice, the materials used, as well as the contingent shapes and dimensions, may be any according to requirements and to the state of the art.

The disclosures in Italian Patent Application No. PD2009A000093 from which this application claims priority are incorporated herein by reference.

What is claimed is:

1. A vibration damping device for a hydraulic shock absorber of a vehicle, comprising a first and a second cartridge, each of which is connected with a respective first and second shock-absorbing means, integrateable in a structural component of a vehicle, wherein each said cartridge comprises: a tubular body closed hermetically at first and second ends thereof; a piston contained in said tubular body that forms two chambers with variable volumes for incompressible fluid, said chambers being a compression chamber, and an extension chamber; a stem, carrying said piston, and exiting from one of the ends of said tubular body, said stem being connected with part of the shock-absorbing means; orifices provided in said piston for bleeding pressurized incompressible fluid; and flow control and throttling means for controlling said orifices, and wherein the first cartridge has located in the extension chamber thereof, which is at low pressure during a compression movement of the first shock-absorbing means, a partition, said partition being provided movable or elastically deformable so as to delimitate a sub-chamber with compressible fluid for volume compensation and propulsion of the incompressible fluid when movement of the piston is reversed; and the second cartridge has in the compression chamber thereof, which is at low pressure during an extension movement of the second shock-absorbing means, a further partition, which is provided movable or elastically deformable so as to form a further sub-chamber with compressible fluid for volume compensation and propulsion of the incompressible fluid when a movement of the piston is reversed.

2. The device of claim 1, wherein said partition is elastically deformable.

3. The device of claim 1, wherein said further partition is rigid and is suitable to perform a translational motion at a portion of the tubular body proximate to the first end thereof, which is fixed to a lower end of a structural element of a vehicle.

4. The device of claim 1, wherein said flow control and throttling means are provided at one side of each piston by elastic disks, which are deformable, proportionally to the force with which the incompressible fluid presses against the elastic disks in passing through the piston orifices so as to leave a passage port, and are provided at the opposite side of each piston by a membrane device pushed by an associated elastic element, said flow control and throttling means being suitable to control fluid flow so that:

said compression chamber of said first cartridge is a chamber at higher pressure during compression of the shock absorbers; and said extension chamber of said second cartridge is a chamber at higher pressure during the extension of the shock absorbers.

\* \* \* \* \*